(12) United States Patent
Bissell et al.

(10) Patent No.: US 10,767,093 B2
(45) Date of Patent: *Sep. 8, 2020

(54) PHASE CHANGE COMPOSITIONS

(71) Applicant: SunAmp Limited, Edinburgh (GB)

(72) Inventors: Andrew John Bissell, Edinburgh (GB);
David Oliver, Edinburgh (GB); Colin Richard Pulham, Edinburgh (GB)

(73) Assignee: SunAmp Limited, Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,764

(22) Filed: Apr. 24, 2018

(65) Prior Publication Data
US 2018/0237676 A1 Aug. 23, 2018

Related U.S. Application Data

(63) Continuation of application No. 14/895,306, filed as application No. PCT/GB2014/051692 on Jun. 3, 2014, now Pat. No. 10,308,855.

(30) Foreign Application Priority Data

Jun. 3, 2013 (GB) .................................. 1309871.0

(51) Int. Cl.
*C09K 5/00* (2006.01)
*C09K 5/06* (2006.01)

(52) U.S. Cl.
CPC .................................. *C09K 5/063* (2013.01)

(58) Field of Classification Search
None
See application file for complete search history.

(56) References Cited

U.S. PATENT DOCUMENTS 5,827,915 A * 10/1998 Saita .................... C09K 5/06
524/394
2008/0255299 A1 10/2008 Reezigt
(Continued)

FOREIGN PATENT DOCUMENTS

AU     S69 739       6/1996
CN     1944567 A     4/2007
(Continued)

OTHER PUBLICATIONS

Corresponding Cuban Office Action for Application No. 2015-0169, dated Mar. 12, 2015.
(Continued)

*Primary Examiner* — Necholus Ogden, Jr.
(74) *Attorney, Agent, or Firm* — Barnes & Thornburg LLP

(57) ABSTRACT

There are herein described phase change materials containing sodium acetate trihydrate having improved homogeneity, a process for the preparation of said materials, and their utility in phase change systems. More particularly, the present invention relates to the use of phase change compositions comprising sodium acetate trihydrate, at least one alkali soluble polymer for inhibition of sodium acetate anhydrous crystal formation in sodium acetatetrihydrate containing phase change materials, and at least one sodium acetate trihydrate nucleation promoter, and, if a lower phase change temperature is required, at least one melting point depressing agent.

16 Claims, 3 Drawing Sheets

(56) References Cited

U.S. PATENT DOCUMENTS

| | | | |
|---|---|---|---|
| 2009/0211726 A1* | 8/2009 | Bank ................ | C09K 5/063 165/10 |
| 2010/0183878 A1 | 7/2010 | Reezigt | |
| 2012/0048768 A1 | 3/2012 | Holloway | |

FOREIGN PATENT DOCUMENTS

| | | |
|---|---|---|
| CN | 101418209 A | 4/2009 |
| CN | 101778922 A | 7/2010 |
| CN | 101805591 A | 8/2010 |
| CN | 102212340 A | 10/2011 |
| CN | 102604599 A | 7/2012 |
| CN | 102757766 A | 10/2012 |
| CN | 102757768 A | 10/2012 |
| JP | S59 22986 | 2/1984 |
| JP | S59-22986 A | 2/1984 |
| JP | 2000 282017 | 10/2000 |
| JP | 2000282017 A | 10/2000 |
| JP | 2004149796 A | 5/2004 |
| RU | 2188842 C1 | 9/2002 |
| WO | 1994/004630 | 3/1994 |
| WO | 2008-153378 | 12/2008 |
| WO | 2009/138771 | 11/2009 |

OTHER PUBLICATIONS

Singapore Search Report for Application No. 11201509937W, dated Aug. 10, 2016.

Wada, T., et al., "Studies on Salt Hydrates for Latent Heat Storage", Bulletin of the Chemical Society of Japan, vol. 55 (1982), p. 3603.

Wada, T., et al., "Heat Storage Capacity of Sodium Acetate Trihydrate During Thermal Cycling", Solar Energy, vol. 33 (1984), pp. 373-375.

Kimura, H., "Nucleating Agents for Sodium Acetate Trihydrate", Journal of the Japanese Association of Crystal Growth, vol. 9, Issue 3 (1982), p. 71 (Including English Translation).

Corresponding European Office Action for Application No. 14 732 596.3, dated Jul. 17, 2018.

Corresponding Chinese Office Action for Application No. 201480033153.4, dated Aug. 8, 2018.

Corresponding U.S. Office Action for U.S. Appl. No. 14/895,306, dated Aug. 6, 2018.

Corresponding Indian Office Action for Application No. 11003/DELNP/2015, dated Jan. 8, 2019.

Korean Search Report for Application No. UAE/P/1622/2015 dated Dec. 10, 2019.

* cited by examiner

PHASE CHANGE COMPOSITIONS

This application is a continuation of U.S. Pat. Ser. No. 14/895,306, filed Dec. 2, 2015, which is a national stage application of International Application No. PCT/GB2014/051692, filed Jun. 3, 2014, which claims the benefit of GB 1309871.0, filed Jun. 3, 2013, the entire contents of each are hereby incorporated herein by reference.

FIELD OF THE INVENTION

The present invention relates to phase change materials containing sodium acetate trihydrate having improved homogeneity, a process for the preparation of said materials, and their utility in phase change systems. More particularly, the present invention relates to the use of phase change compositions comprising sodium acetate trihydrate, at least one alkali soluble polymer for inhibition of sodium acetate anhydrous crystal formation in sodium acetate trihydrate containing phase change materials, and at least one sodium acetate trihydrate nucleation promoter.

BACKGROUND OF THE INVENTION

There are many heating and cooling systems on the market and many of these are reliant on fossil fuels. With the ever increasing demand for more environmentally friendly systems various alternative systems based on sunlight or water have been proposed such as for example photovoltaics, solar thermal electricity generators, hydroelectricity, wave power and bio-fuels.

An issue common to all solar-driven renewable energy conversion devices, some hydro-driven devices, and wind turbines is that they cannot operate "on demand", as the sun does not always shine, the seas are not always high and the wind does not always blow. This means that at some times these so-called intermittent renewable sources will generate electricity which cannot be easily integrated into their corresponding local electricity grids, and as such there have been a number of storage solutions proposed.

The thermal energy storage system, proposed in WO 2009/138771 converts surplus electrical energy from intermittent renewable sources into heat or cool when available, store the so-converted heat or cool in a thermal store, and then make it available as useful heat or cool on demand using phase change materials (PCMs) to effect the energy conversion via their inherent solid-liquid phase changing properties.

For practical application in domestic situations phase change materials capable of supplying warm, or even hot, water that is just above the comfort level temperature of the individual requiring the heated water are needed. In addition, phase change materials suitable for such practical utility should achieve rates of heat transfer into and out of, their phase changes, which are commensurate with domestic use, as well as deliver acceptable levels of thermodynamic stability (efficiency).

Sodium acetate trihydrate, (SAT), has a solid-liquid phase change within the desired temperature range for domestic utility. However, the practical applications of SAT as a phase change material (PCM) are limited by the unique and incongruous manner in which it melts, going from solid SAT, to a mixture of liquid SAT and a solid (sodium acetate/SA) at a set temperature, 58° C. This inability to provide a fully liquid solution at 58° C. is an issue which is reflected in the thermodynamic stability of aqueous solutions upon initial heating, as well as the thermodynamic stability of, re-formed, aqueous solutions provided following re-heating after cooling in accordance with the normal heating/cooling cycles in phase change systems.

This solid-formation on melting is a problem for use as SAT as a PCM because this solid SA, once formed, would ordinarily be retained throughout the lifetime of the PCM in a phase change system.

Previous attempts to overcome this issue via the utility of three dimensional cross-linked polymers, such as cellulose based polymers and super absorbent polymers, to act as solid supports have been unsuccessful because, independent of any apparent initial reduction of solid formation, the underlying problem of solid sodium acetate formation is unresolved, and over time solid sodium acetate will still precipitate out of solution, and collect at the base of the PCM storage vessel irreversibly. For utility as a PCM, no solution which has a finite lifetime is acceptable.

It is an object of at least one aspect of the present invention to obviate or mitigate at least one or more of the aforementioned problems in relation to the utility of sodium acetate trihydrate as a potential PCM for use in aqueous phase change systems.

It is an object of at least one aspect of the present invention to provide improved phase change materials containing sodium acetate trihydrate having desirable homogeneity; resistance to SA formation, which are suitable for use in phase change systems.

It is an object of at least one aspect of the present invention to provide improved phase change materials containing sodium acetate trihydrate which can be heated, cooled and re-heated in repeated cycles with retention of thermodynamic stability.

The Applicant has developed novel and inventive aqueous compositions for use as phase change materials comprising: sodium acetate trihydrate; at least one alkali soluble polymer for inhibition of sodium acetate anhydrous crystal formation in sodium acetate trihydrate containing phase change materials; and at least one sodium acetate trihydrate nucleation promoter. The Applicant has also developed a process for the preparation of said improved phase change materials.

SUMMARY OF THE INVENTION

The Applicant has developed novel and inventive phase change compositions containing sodium acetate trihydrate as a phase change material.

Accordingly the present invention provides compositions containing sodium acetate trihydrate as a phase change material comprising:
(a) sodium acetate trihydrate or sodium acetate anhydrous;
(b) at least one suitable alkali soluble polymer;
(c) at least one suitable nucleation promoter; and
(d) water.

As demonstrated in the Examples hereinafter the Applicant has surprisingly found that the compositions of the present invention which contain sodium acetate trihydrate as a phase change material display unprecedented improvements in homogeneity and thermodynamic stability properties than previously achievable using sodium acetate trihydrate as a PCM. In particular the Applicant has found that the compositions of the present invention which contain sodium acetate trihydrate as a phase change material are resistant to the nucleation of crystalline sodium acetate on heating and cooling.

According to a further aspect the present invention provides for the use of the compositions according to the invention as phase change materials suitable for use in phase change systems.

The Applicant has also developed a novel process for the preparation of the compositions according to the invention. According to a further aspect the present invention provides a process for the preparation of compositions containing sodium acetate trihydrate as a phase change material which comprises:
(a) mixing an aqueous solution comprising sodium acetate anhydrous with at least one suitable alkali soluble polymer; and at least one nucleation promoter;
(b) heating the resultant mixture to provide a 58° C. phase change material containing sodium acetate trihydrate.

When sodium acetate trihydrate is used, the following steps are followed:
(a) heating the sodium acetate trihydrate to a temperature above 58° C.; and
(b) mixing the sodium acetate trihydrate with at least one suitable alkali soluble polymer; and at least one nucleation promoter.

BRIEF DESCRIPTION OF THE DRAWINGS

Embodiments of the present invention will now be described, by way of example only, with reference to the accompanying drawings.

DETAILED DESCRIPTION

Figure 1:
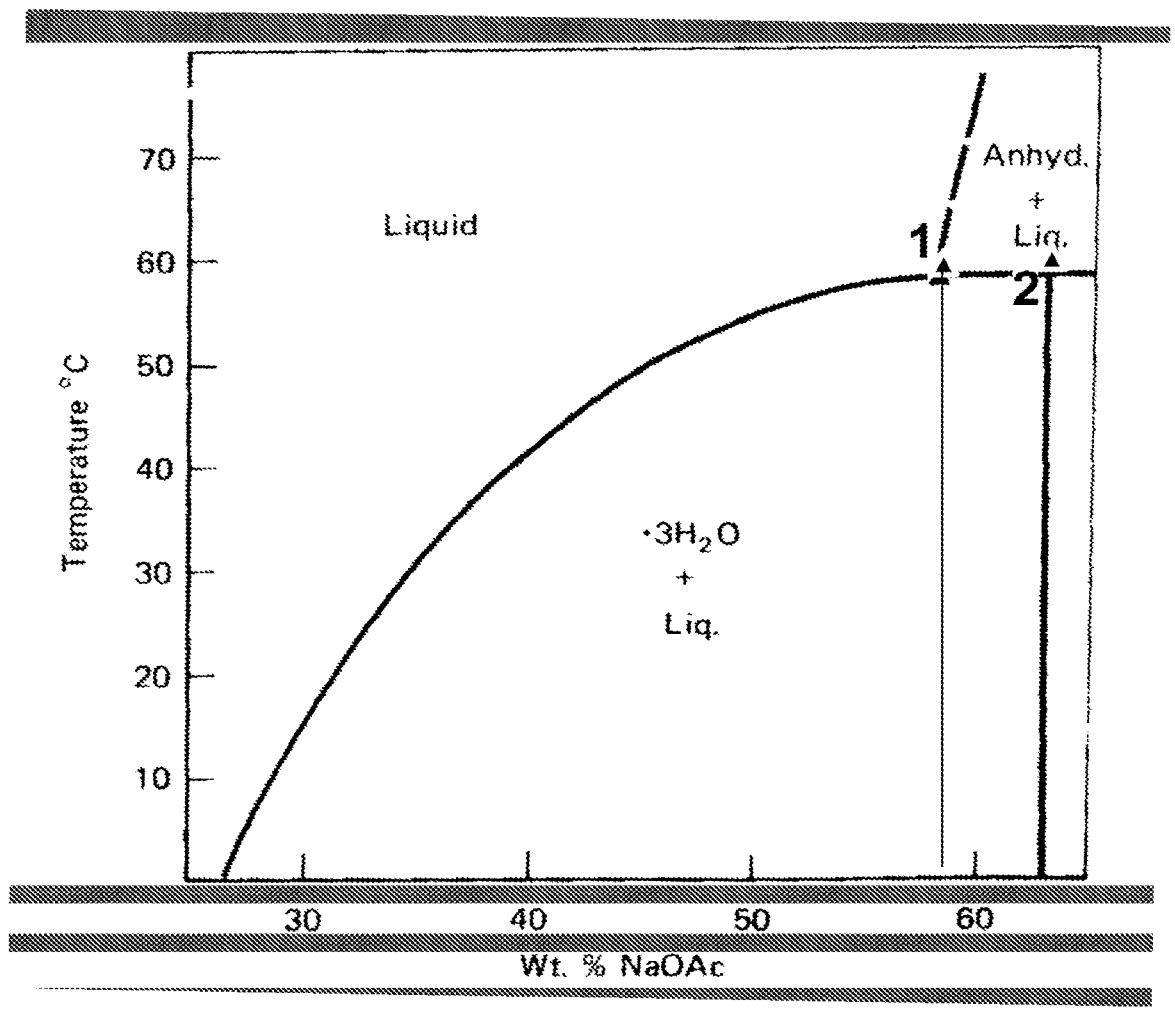
FIG. 1 is a phase diagram of sodium acetate and water, showing the solubility limit of sodium acetate in water, at about 58° C., is at about 58.0%, whereas the corresponding sodium acetate trihydrate, which melts at 58° C., is made up of 60.28% of SA and 39.72% of water, a value noticeable higher than the solubility limit at 58° C., as indicated by point 2.

The novel compositions according to the present invention are aqueous compositions containing sodium acetate trihydrate, $NaOAc \cdot 3H_2O$, also known as SAT, as a phase change material. Any form of sodium acetate anhydrous, also known as SA, may be used in the preparation the novel compositions containing SAT as a PCM in accordance with the invention. For the avoidance of doubt this means that as all solid forms of NaOAc are crystalline, and therefore any crystalline form may be used.

The level of sodium acetate anhydrous used in the preparation of the aqueous compositions according to the invention is between about 40% to about 60% by weight of the total composition. This corresponds to a relative amount of from about 66% to about 100% of sodium acetate trihydrate in the aqueous compositions of the invention. For the avoidance of doubt the compositions according to the present invention are substantially free-from, and are more preferably free-from solid anhydrous sodium acetate.

For the avoidance of doubt, where the actual or relative amounts of water in any particular composition according to the invention described herein are not specified it should be understood that the actual or relative amount of water required will be that sufficient to reach either 100% of composition, either by weight or relative volume. Water may be used either in purified, or distilled form, or from regular supply.

As indicated hereinbefore, despite having a phase change within the desired temperature range for domestic heating purposes, the utility of sodium acetate trihydrate as a potential PCM to-date has been hampered due to inherent melting incongruences. During the melting process sodium acetate trihydrate changes from solid SAT, to a mixture of liquid SAT and solid at a set temperature, 58° C. This is due to the formation of sodium acetate anhydrous, NaOAc, or SA. For the avoidance of doubt, where the term sodium acetate, or SA, is utilised herein it means sodium acetate anhydrous, as opposed to any hydrated form, or the trihydrate, SAT in particular. As indicated by point 1, in FIG. 1, a phase diagram of sodium acetate and water, the solubility limit of sodium acetate in water, at about 58° C., is at about 58.0%, whereas the corresponding sodium acetate trihydrate, which melts at 58° C., is made up of 60.28% of SA and 39.72% of water, a value noticeable higher than the solubility limit at 58° C., as indicated by point 2, in FIG. 1. When SA is formed during the melting of aqueous SAT, a fully liquid state may be re-instated via the addition of more water, to alter the composition to the composition of 58% SA, and solubilise SA anhydrous, thereby providing a fully liquid material at 58° C. The so-produced solution is thermodynamically stable, i.e. it is neither in the metastable zone, nor in the supersaturated zone, thus no further solid material (SA) should crystallise out.

As explained hereinbefore, such a re-instated liquid solution comprising water and sodium acetate trihydrate is not suitable for use as a phase change agent because, it is not capable of being cooled and reheated to provide a thermodynamically stable homogeneous liquid. As demonstrated in the Examples hereinafter, the Applicant has found when such a solution is cooled down and seeded with some sodium acetate trihydrate, a solid sample of sodium acetate trihydrate is formed. Applicant has also found that when such a cooled solution is heated up to 58° C. again, a solution with some solid sodium acetate anhydrous, SA, is formed i.e. the solution is not in fact in thermodynamic equilibrium.

Mixing and/or agitation would return the composition to its thermodynamic equilibrium, a homogenous solution; however without such mechanism, as in this invention, a homogenous solution does not prevail.

As illustrated in FIG. 1, crystalline sodium acetate trihydrate melts to form sodium acetate anhydrous and a concentrated solution of aqueous sodium acetate. In simple terms, and in accordance with general chemical practice, the addition of more water added would be expected to dissolve this additional sodium acetate (the anhydrous solid). More accurately, this extra water would be expected to dilute the concentrated solution comprising sodium acetate anhydrous and water, which in turn would enable the solid sodium acetate anhydrous to dissolve into it. Most surprisingly, the Applicant has demonstrated that this does not occur in practice, and further that the resistance to dissolution of the anhydrous solid is in fact unaltered due to the additional water level.

Without wishing to be bound to any particular theory it is postulated herein that, during the melting process, molecules of sodium acetate trihydrate dissociate incongruently, and also that there is rapid exchange between the sodium acetate in the liquid phase and the sodium acetate in the solid phase. The solid sodium acetate anhydrous molecules are thought to initially be present in small clusters. Such small clusters are thought to possibly contain hundreds of molecules of SA, and are not considered to be crystalline. It is further proposed herein that as any one of these clusters increases in size it can eventually attain the critical cluster size, or threshold size, required to become a crystallite. It is further proposed herein that such crystallites, grouping together, form the dense crystals of sodium acetate that are observed as the unwanted solid precipitated material in the aforementioned Example. The Applicant has observed that the formation of solid precipitate, during the melting process, occurs too quickly for the dissolution of additional water to have any significant impact.

The Applicant has resolved this issue of non-homogeneous liquid formation in aqueous phase change materials containing sodium acetate trihydrate via the provision of PCMs containing NaOAc·3H$_2$O which are resistant to the formation of NaOAc crystallites via the utility of one or more particular alkali soluble polymers.

Without being bound to any particular theory it is thought that the particular polymers utilised in the PCMs containing sodium acetate trihydrate according to the present invention composition provide resistance to the formation of precipitated NaOAc in aqueous NaOAc·3H$_2$O solutions via a combination of effects including: viscosity effects; crystal habit modifying behaviour; 3D-lattice effects. As such, the one or more alkali soluble polymers suitable for use herein may also be referred to as SA crystal inhibitors, or inhibitors of the formation of crystalline SA from aqueous solutions.

At one level by harnessing the ability of these particular polymers to increase the viscosity of solutions it is believed that at least some of the sodium acetate anhydrous formed during the melting process may remain suspended long enough to dissolve and thereby reduce the potential for SA precipitation from solution, and subsequent collection within the phase change system equipment during use. It is also proposed herein that use of these particular polymers would provide solid sodium acetate having a significantly increased effective surface area in solution, versus that previously possible (for SA only aqueous systems) when the solid is amassed at the base and only the top of this solid layer is in contact with the solution. It is further proposed herein that even dispersal of the solid sodium acetate in this more viscous solution for an extended period of time, may increase the dissolution rate and thereby reduce the rate at which the anhydrous form of sodium acetate could form, and potentially may prevent formation altogether.

Polymers suitable for use in the novel compositions herein containing SAT as PCMs in accordance with the first or further aspects of the invention as detailed herein are soluble in aqueous alkaline solution. As defined herein polymers suitable for use herein are soluble in aqueous alkaline solutions having a pH in excess of about pH 8. More particularly polymers suitable for use herein are soluble in highly alkaline aqueous solution having a pH of about pH 9, such as aqueous sodium acetate solution. The compositions herein include one or more polymers, as defined herein, wherein each polymer may be independently present at levels of from about 0.1% to about 10%, from about 0.2% to about 4%, from about 0.5% to about 2% are utilised in the aqueous compositions according to the present invention.

In addition, polymers suitable for use herein have one or more carboxylic acid groups and may be utilised as acids, or as acid salts. For the avoidance of doubt the term polymer as used herein includes both polymers of repeated singular monomeric units, and co-polymers comprised of mixed monomeric units having varying repeating patterns.

A group of preferred polymers for use herein are polymers having repeating units of general formula I:

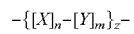

and salts thereof
wherein z is 10 to 1,000;
n=1 to 10 to 1,000; and wherein m=0 to 1,000
wherein the ratio of n:m is in the range of from about X:Y and wherein the molecular weight of the polymer is in the range of from about P to about Q, X is independently selected from groups based on the following monomers: ethylene, acrylic acid, methyl methacrylate, acrylamide, ethyl methacrylate, ethacrylic acid, ethyl oxide, diallyldimethylammonium chloride, vinyl pyrrolidone, N-isopropylacrylamide, styrene, maleic acid and mixtures thereof, Y is independently selected from groups based on the following monomers: ethylene, acrylic acid, methyl methacrylate, acrylamide, ethyl methacrylate, ethacrylic acid, ethyl oxide, diallyldimethylammonium chloride, vinyl pyrrolidone, N-isopropylacrylamide, styrene, maleic acid and mixtures thereof, A group of preferred polymers according to general formula I for use herein have monomeric repeating units of general formula II.

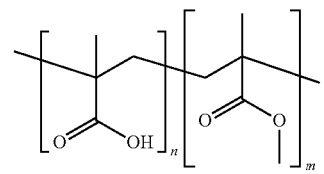

and salts thereof wherein n, m and z are as defined hereinbefore
wherein the ratio of n:m is about 1:2 and wherein the molecular weight is in the range of from about 1,000 to 1,000,000.

Preferred polymers of general formula II for use herein are either acids or acid salts, more particularly either acids or metal acid salts, and especially acids or sodium, potassium or zinc acid salts. The copolymer of methacrylic acid and methyl methacrylate, poly(methacrylic acid co-methyl methacrylate) having a molecular weight of from about 500,000 to about 1,000,000, and the sodium, potassium or zinc salts thereof are polymers within general formulae I, II and III, and are particularly suited for use herein.

Another group of preferred polymers for use herein according to general formula I for use herein have repeating units of general formula III:

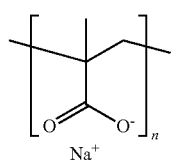

and metal salts thereof selected from sodium or potassium, and
wherein z and n are as defined herein before.

A preferred polymer of formula III for use herein is poly(methacrylic acid), particularly the sodium salt, preferably in 30 or 40% aqueous solution wherein the polymer has an average molecular weight of about 10,000 or 4-6,000

Thus, the present invention provides compositions as defined hereinbefore wherein the one or more alkaline soluble polymers are selected from general formulae II or III and mixtures thereof each independently present at a level of from about at levels of from about 0.1% to about 10%, from about 0.2% to about 4%, from about 0.5% to about 2%. In addition, there are provided compositions as defined hereinbefore wherein the polymer is: the copolymer of methacrylic acid and methyl methacrylate, poly(methacrylic acid co-methyl methacrylate) having a molecular weight of from about 500,000 to about 1,000,000, or a sodium, potassium or zinc salts thereof; the poly(methacrylic acid), or the sodium salt having an average molecular weight of about 10,000, and wherein either polymer may be independently present at a level of from about at levels of from about 0.1% to about 10%, from about 0.2% to about 4%, from about 0.5% to about 2%. According to a further aspect the present invention provides a composition having either one or the above two polymers at the levels defined above.

The improved PCM compositions according to the present invention containing SAT as a PCM have been demonstrated to form homogeneous liquids without the need to add excessive additional water, which is in stark contrast to the precipitated systems observed without polymers. However it is the demonstrated improvements in both homogeneity and thermodynamic stability following cooling and re-heating, between the SAT containing PCM systems of the invention with polymers, when compared to the behaviour displayed by sodium acetate trihydrate without polymers which are truly revolutionary.

Figure 2:
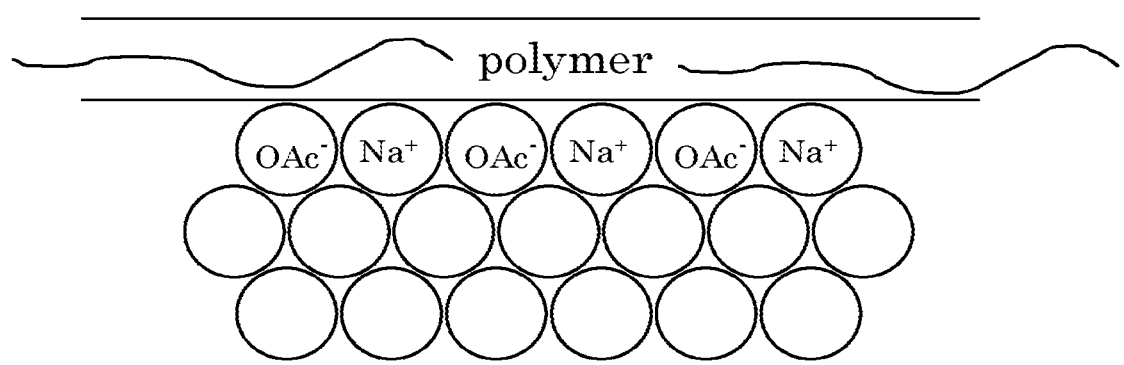
FIG. 2 is a proposed mechanism where the polymer interacts with the surface of highly metastable sub-critical clusters of sodium acetate molecules to prevent, or block, their further growth into crystallites, and hence precipitated material in due course, via a blocking mechanism.

Without being bound to any particular theory it is proposed herein that phenomenal abilities observed for the various different SAT/polymer systems tested for the delivery unprecedented inhibition of nucleation in aqueous sodium acetate trihydrate systems is due to a consistent, underlying technical effect common to them all. Whilst the precise mechanism of crystal nucleation inhibition in these systems is unknown, it is proposed herein that the polymer interacts with the surface of highly metastable sub-critical clusters of sodium acetate molecules to prevent, or block, their further growth into crystallites, and hence precipitated material in due course, via a blocking mechanism. FIG. 2 provides a proposed illustration of this mechanism.

The Applicant has found that even when the polymeric systems herein are seeded with SA, to in effect force the formation of solid material, the so-formed solid material is very different in both appearance and behaviour to that observed in the corresponding solid material formed in non-polymeric systems. It is in this impact upon the behaviour of the resultant solid, which suggests that the solid may exist in a different structural habit, and that the polymers act as crystal habit modifiers.

Whilst these modified polymer containing aqueous solutions of sodium acetate are indeed most surprisingly and desirably resistant to SA formation, they are not suitable for utility as PCMs because, as has been most clearly demonstrated both by the experiments and results discussed herein and as the SA phase diagram of FIG. 1, sodium acetate trihydrate does not readily nucleate, even in supersaturated solutions. This means that a nucleating agent is required to promote the nucleation of the sodium acetate trihydrate from the aqueous solution.

Nucleating agents, as defined herein are also known as nucleators, or nucleation promoters. In some cases, the effective pairing of a particular material with a particular nucleating agent can be the result of iso-structural similarities between the nucleator and the salt hydrate in their crystalline forms, and indeed this is the case with many known-pairs. For example strontium chloride hexahydrate acts as a nucleator for calcium chloride hexahydrate, and sodium tetraborate decahydrate acts as a nucleator for sodium sulfate decahydrate and in each pairing they have very similar molecular packing in their respective crystalline forms.

For sodium acetate trihydrate identification of a suitable nucleator is a more challenging matter. Whilst disodium hydrogen phosphate (DSP) and tetrasodium pyrophosphate (TSPP) have been identified as potential nucleators for SAT their mechanism of action remains unknown. (T Wada and R Yamamoto "Studies on salt hydrates for latent heat storage. 1. Crystal nucleation of sodium acetate trihydrate catalyzed by tetrasodium pyrophosphate decahydrate, Bulletin of the Chemical Society of Japan. Volume 55, page 3603, 1982; T Wada, R Yamamoto and Y Matsuo "Heat storage capacity of sodium acetate trihydrate during thermal cycling", Solar Energy. Volume 33, pages 373 to 375, 1984; and H Kimura, "Nucleating agents for sodium acetate trihydrate", Journal of the Japanese Association of Crystal Growth. Volume 9, issue 3, page 73, 1982.)

Furthermore there is an acknowledged so-called deactivation of these nucleators at high temperatures which undermines their potential for consideration as potential pairs for SAT PCMs for use in phase change systems because by their nature PCMs are intended for long-term use, and require on-demand, reliable activation throughout the anticipated heating/cooling/re-heating cycles therefor.

Surprisingly the Applicant has identified a particular hydrate of disodium hydrogen phosphate, the dihydrate, to be the active nucleating species for SAT, and has also demonstrated that utility of this hydrate in aqueous polymeric solutions containing SAT as detailed hereinbefore provides compositions highly suited for use as PCMs in phase change systems. The compositions according to the present invention typically contain one or more nucleation promoters each independently present at a level of from about 0.1% to about 5%, from about 0.2% to about 3%, from about 0.5% to about 2%.

Thus the present invention additionally provides compositions containing sodium acetate trihydrate as a phase change material comprising:
 (a) from about 48 to about 60% of sodium acetate anhydrous;
 (b) from about 0.1% to about 10% of at least one suitable alkali soluble polymer;
 (c) from about 0.1% to about 5% of at least one suitable nucleation promoter; and
 (d) water to balance.

Alternatively, when sodium acetate trihydrate is used, the composition above changes to:
 (a) from about 80% to about 100% of sodium acetate trihydrate;
 (b) from about 0.1% to about 10% of at least one suitable alkali soluble polymer;
 (c) from about 0.1% to about 5% of at least one suitable nucleation promoter; and
 (d) water to balance.

Whilst any material capable of nucleating SAT is suitable for use herein, preferred materials which both nucleate SAT and retain their effectiveness at high temperatures are particularly suited for use in the compositions for use as PCMs according to the present invention. Such materials include: disodium hydrogen phosphate (DSP); tetrasodium pyrophosphate (TSPP); and hydrated forms thereof. Particular materials suitable for use herein are disodium hydrogen phosphate dihydrate, and tetrasodium pyrophosphate decahydrate. Thus, the present invention provides compositions as defined hereinbefore wherein the nucleation promoters are disodium hydrogen phosphate (DSP); tetrasodium pyrophosphate (TSPP); and hydrated forms thereof each independently present at a level of from about 0.1% to about 5%, from about 0.2% to about 3%, from about 0.5% to about 2%. In addition, there are provided compositions as defined hereinbefore wherein the nucleation promoters are disodium hydrogen phosphate dihydrate and tetrasodium pyrophosphate decahydrate and wherein the total level of these promoters is from about 0.5% to about 5%, from about 0.2% to about 2.5%, from about 0.5% to about 2%.

In addition to the polymer and the nucleation promoter the compositions according to the invention may additionally comprise a further agent to modify the melting point of SAT when in use as a PCM. Any suitable agent capable of providing a desirable melting point modification can be used, for the avoidance of doubt melting point modification, means a lowering of the melting and crystallisation point. Such modifying agents may be utilised at a relative concentration level of from about 1% to about 25%, 5% to about 25%, from about 10% to about 20%, from about 2% to about 10% of the total mass. Example agents for lowering the melting point of SAT in the compositions herein include: metal salts such as ithium acetate dihydrate; and organic compounds such as acetamide and trimethylolethane which could also include non-metal salts, e.g. ammonium acetate.

Thus the present invention additionally provides compositions containing sodium acetate trihydrate as a phase change material comprising:
(a) from about 35% to about 60% of sodium acetate anhydrous;
(b) from about 0.1% to about 10% of at least one suitable alkali soluble polymer;
(c) from about 0.1% to about 5% of at least one suitable nucleation promoter;
(d) from about 1% to about 95% of an optional melting point depressing agent; and
(e) water to balance.

Preferred herein are compositions wherein the lithium acetate dihydrate is utilised as a melting point depressing agent at levels of from about 1% to about 25%, from about 5% to about 25%, from about 10% to about 20%.

Lithium acetate dihydrate is 64.67% LiOAc and 35.33% water, values below copied from above but x by 64,67.

Preferred herein are compositions wherein the lithium acetate anhydrous is utilised as a melting point depressing agent at levels of from about 0.65% to about 16.17%, from about 3.23% to about 16.17%, from about 6.47% to about 12.93%.

The melting point may also be depressed by addition of acetamide and trimethylolethane.

The compositions of the invention containing SAT as a PCM can be made according to a process comprising:
(a) mixing an aqueous solution comprising sodium acetate anhydrous with at least one suitable alkali soluble polymer; at least one nucleation promoter, and at least one melting point depressing agent;
(b) heating the resultant mixture to provide a 58° C. phase change material containing sodium acetate trihydrate.

According to a preferred process herein the from 35% to about 60% of sodium acetate anhydrous, from about 0.1% to about 10% in total of suitable alkali soluble polymer(s), from about 0.1% to about 5% in total of one or more nucleation promoter are utilised and optionally from about 1% to about 25% of melting point depressing agent may be included in the mixing stage. An example of this process is found in Example 3 hereinafter.

According to a preferred process herein the from 35% to about 60% of sodium acetate anhydrous, from about 0.1% to about 10% in total of suitable alkali soluble polymer(s), from about 0.1% to about 5% in total of one or more nucleation promoter are utilised and optionally from about 1% to about 95% of melting point depressing agent may be included in the mixing stage.

Alternatively the polymer may be formed in situ in the molten (heated) aqueous SAT mixture, in which instance the relevant monomers would be added into the aqueous solution and polymerisation would be initiated. Therefore, the PCM can be made in either the heat battery enclosure before including the heat exchanger and sealing it or the PCM can be made in an external vessel and then poured into the enclosure containing heat exchanger.

The following non-limiting examples provided in the Experimental results hereinafter are representative of the PCM compositions according to the invention, as are the processes for their preparation.

Experimental Results

EXAMPLE 1

Addition of Polymer 1 to Aqueous Sodium Acetate to Prevent Precipitation

1% (2g) of a poly(methacrylic acid co-methyl methacrylate) 2:1 copolymer having a molecular weight of 500,000-1,000,000 (available from Fluka, as Polyacrylic acid, cas 25086-15-1 (labelled medium viscosity, mr ~500,000-1,000,000, copolymer of methacrylic acid and methyl methacralate) was added with stirring to a well-mixed 198g aqueous solution of sodium acetate (available from VWR International Ltd. (UK) as sodium acetate anhydrous 99%) at a concentration of 58.24% (17.002 mol dm$^{-3}$) at from about 60 to about 70° C. and then allowed to cool down to room temperature (RT).

At RT a homogenous liquid was observed which is in stark contrast to the same solution but without any polymer where significant of precipitation of sodium acetate was observed. Further, cycling experiments were preformed throughout a temperature range of between about 25 to about 80° C. which confirmed that the beneficial effects observed for polymer-assisted solution were consistent across the range tested. In addition, further experiments confirmed that sodium acetate could only be initiated to form with seeding at RT.

EXAMPLE 2

Addition of Polymer 2 to Aqueous Sodium Acetate to Prevent Precipitation (0.66% with respect to only polymer) 22.6 g of a 30% aqueous solution of poly(methacrylic acid, sodium salt) having a molecular weight of 9,500 (available from Sigma Adrich, UK, as Poly(methacrylic acid, sodium salt) solution average $M_n$~5,400, average $M_w$~9,500 by GPC, 30 wt. % in $H_2O$, cas 54193-36-1) was added to a 59.16% (17.66 mol dm$^{-3}$) aqueous solution of sodium acetate(1,000 g) in accordance with the method of Example 1 and then allowed to cool down to room temperature (RT).

EXAMPLE 3

Qualification that Polymer Systems Provide Homogeneous Liquids at 58° C.

Test samples containing various levels of polymers 1 and 2, and varying initial aqueous concentrations of sodium acetate, were left undisturbed at RT for several weeks. Where sodium acetate were observed, it appeared as a large white mass taking up the whole sample container. This mass is thought to be an intricate mixture of sodium acetate and water, and yet had the appearance of a solid. When the sample container was squeezed the mass was observed to be very soft. On careful stirring this mass was found to appear as fine needle-like crystals and furthermore, heating such samples to 58° C. resulted in homogenous liquids, which were in agreement with the phase diagram of FIG. 1, point 2, as discussed hereinbefore.

In addition test samples were carefully seeded with sodium acetate were also left undisturbed, and the resulting solid sodium acetate appeared as a large white mass taking up the whole sample container. This mass is thought to be an intricate mixture of sodium acetate and water, and yet had the appearance of a solid. When the sample container was squeezed the mass was observed to be very soft. On careful stirring this mass was also found to appear as fine needle-like crystals, and furthermore, on heating to 58° C., these samples also provided in homogenous liquids, which were in agreement with the phase diagram of FIG. 1, point 2.

This ability to form homogeneous liquids without the need to add excessive water is in stark contrast to the precipitated systems observed without polymers. However the observed improvements in both homogeneity and thermodynamic stability following cooling and re-heating, between the systems of the invention with polymers and when compared to sodium acetate trihydrate without polymers is truly revolutionary.

EXAMPLE 4

Identification of Active Nucleator for SAT in DSP

Variable temperature powder X-ray diffraction was utilised to identify the dihydrate of disodium hydrogen phosphate as the active nucleator. Samples of sodium acetate trihydrate with disodium hydrogen phosphate dihydrate were cooled and crystallisation of sodium acetate trihydrate took place. Heating the sample to 90° C. resulted in the transition from the dihydrate to anhydrous disodium hydrogen phosphate. Subsequent cooling of this sample, now containing SAT and anhydrous DSP to 25° C., did not return the anhydrous DSP to the DSP dihydrate, and thus no crystallisation of sodium acetate trihydrate could take place.

Additional experiments were carried out to confirm that no deactivation of this system occurs at the temperatures required for utility in compositions for use as PCMs, via either seeding with sodium acetate trihydrate or the active nucleators. The results of these experiments have confirmed that upon such seeding "reactivation" of the nucleators occurs and their effectiveness is fully restored. This is in agreement with previous observations but the Applicant is the first to understand and characterise the hitherto unexplained phenomena.

EXAMPLE 5

Preparation of PCM Formulations Containing SAT

| Material | PCM 1 Weight % | PCM 2 Weight % |
|---|---|---|
| Polymer | 0.67% | 0.67% |
| Sodium acetate | 56.20% | 44.45% |
| Water | 40.31% | 31.87% |
| DSP•2H$_2$O | 1.20% | 1.29% |
| TSPP•10H$_2$O | 1.62% | 1.73% |
| LiOAc•2H$_2$O | — | 20% |

Formulation 1 was prepared as follows sodium acetate anhydrous (134.1 kg, 1634.77 mol), water (94.6 kg, 5251.18 mol) and a polymethacrylic acid polymer (mol wt 9,500) as a 30% aqueous solution (5.3 kg), DSP (2.3 kg, 16.20 mol) and TSPP (2.3 kg, 8.65 mol) were mixed together and heated to about 70° C. This resultant 58° C. PCM produced via this process has no anhydrous sodium acetate formation.

Formulation 2 was prepared as for Formulation 1. The resultant 50°PCM produced also had no anhydrous sodium acetate formation.

Thus the PCMs according to the present invention are free from SA when viewed by the naked eye and experimental techniques such as X-ray powder diffraction.

EXAMPLE 6

Addition of Acetamide to Sodium Acetate Trihydrate to Depress Melting Point

Ratio of SAT to acetamide needed for mixes

| | Mass (g) | |
|---|---|---|
| Molar Ratio | sodium acetate trihydrate | acetamide |
| 9:1 | 19.0798 | 0.9202 |
| 8:2 | 18.0421 | 1.9579 |
| 7:3 | 16.8629 | 3.1371 |
| 6:4 | 15.5112 | 4.4888 |
| 5:5 | 13.9462 | 6.0538 |
| 4:6 | 12.1130 | 7.8870 |
| 3:7 | 9.93611 | 10.0639 |
| 2:8 | 7.3091 | 12.6909 |
| 1:9 | 4.0760 | 15.9240 | a) Starting from the trihydrate form of sodium acetate:
95.53 wt % sodium acetate trihydrate (CAS 6131-90-4) with 2.17 wt % water with 2.30wt % of an aqueous solution of poly(methacrylic acid, sodium salt) (available from Sigma Aldrich UK CAS 54193-36-1) was made up, and heated to 60-70° C., whilst stirring, to create a homogeneous mixture.

b) Starting from the anhydrous sodium acetate:
57.85 wt % sodium acetate (available from VWR International Ltd. as sodium acetate anhydrous 99% CAS 127-09-3) with 39.84% water and 2.31 wt % aqueous solution of poly(methacrylic acid, sodium salt) was heated to 60-70° C. whilst stirring, to create a homogeneous mixture.

Figure 3:
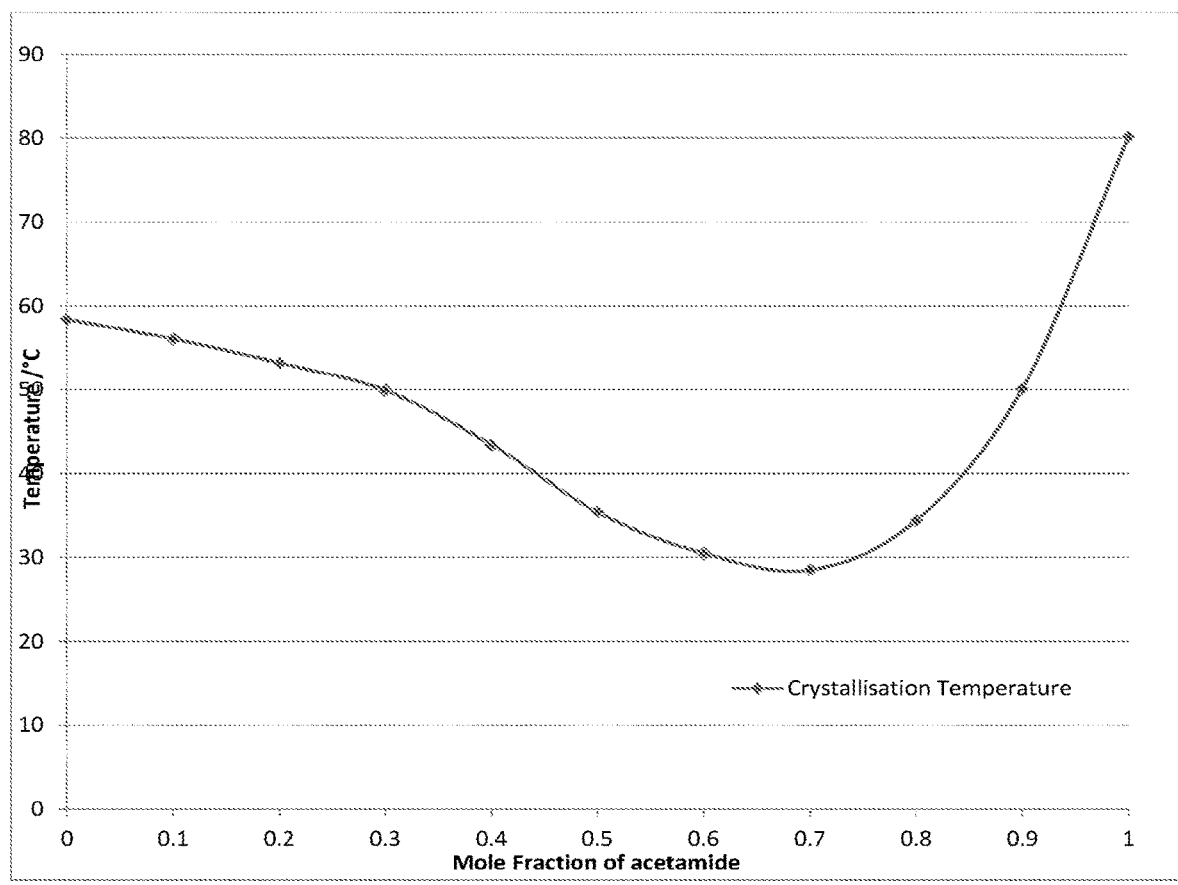
FIG. 3 is a representation of crystallisation temperatures obtained by adding varying levels of acetamide.

To depress the melting and freezing temperatures, this solution was added in varying amounts with acetamide, as shown in the table above. Temperatures were recorded for the melt and freeze (nucleated with a seed crystal) of the samples, and the range of depressions is shown below. Crystallisation temperatures from 58° C. to 28.5° C. can be gained by adding acetamide up to 70 molar %, whereupon the mix nears the eutectic point, after this point freezing temperature increases. This is shown in FIG. 3.

EXAMPLE 7

Addition of Trimethylolethane to Sodium Acetate Trihydrate to Depress Melting Point Sodium acetate trihydrate solution was made as in the methods described in Example 1. To make the mixture samples the SAT solution was added to TME as described in the table below.

| | Mass (g) | |
|---|---|---|
| Molar Ratio | sodium acetate trihydrate | TME |
| 9:1 | 18.2132 | 1.7868 |
| 8:2 | 16.3836 | 3.6164 |
| 7:3 | 14.5096 | 5.4904 |
| 6:4 | 12.5895 | 7.4105 |

The mixtures can either be nucleated manually with a seed crystal, or 2wt % of a nucleator, disodium hydrogen phosphate dihydrate. By increasing the content of trimethyolethane from 0 to 40 molar %, the freezing point of the material has a range from 42° C. to 58° C.

| The effect of increasing the amount of TME on the freezing temperature of the samples | | |
|---|---|---|
| Molar | Temp/° C. | Mass |
| 0% | 58 | 0% |
| 10% | 51.77 | 8.9% |
| 20% | 49.74 | 18.1% |
| 30% | 46.96 | 27.5% |
| 40% | 42.49 | 37.1% |

The invention claimed is:

1. A phase change material in the form of a thermodynamically stable aqueous liquid composition which is resistant to the nucleation of crystalline sodium acetate on heating and cooling, the thermodynamically stable aqueous liquid composition comprising:
   a mixture of sodium acetate anhydrous with at least one suitable alkali soluble polymer for inhibition of sodium acetate anhydrous crystal formation and crystalline sodium acetate trihydrate; and at least one sodium acetate trihydrate nucleation promoter wherein the phase change material is in the form of an aqueous solution which comprises:
   from 40% to 60% of sodium acetate anhydrous;
   from 0.1% to 10% of at least one alkali soluble polymer;
   from 0.1% to 5% of at least one nucleation promoter;
   optionally, from 1% to 25% of a melting point depressing agent; and
   water to balance.

2. The composition according to claim 1, wherein the at least one -alkali soluble polymer comprises:
   a copolymer of methacrylic acid and methyl methacrylate, or poly(methacrylic acid comethylmethacrylate) or a sodium, potassium or zinc salt thereof; or
   poly(methacrylic acid) or the sodium salt thereof; or
   a mixture thereof.

3. The composition according to claim 1, wherein the sodium acetate trihydrate is present in an amount of from about 80% to about 100%, by weight of the composition.

4. The composition according to claim 1, wherein the anhydrous sodium acetate is present in an amount of from about 45% to about 60%, by weight of the composition.

5. The composition according to claim 1, wherein the at least one alkali-soluble polymer is independently present in an amount of from about 0.2% to about 4%, by weight of the composition.

6. The composition according to claim 1, wherein the at least one sodium acetate trihydrate nucleation promoter is independently selected from the group consisting of a metal phosphate, a metal pyrophosphate, a metal triphosphate, a metal polyphosphate, and mixtures and hydrogen acids thereof.

7. The composition according to claim 1, wherein the at least one sodium acetate trihydrate nucleation promoter is
   disodium hydrogen phosphate dihydrate and hydrated forms thereof;
   tetrasodium pyrophosphate decahydrate and hydrated forms thereof; or
   mixtures thereof.

8. The composition according to claim 1, wherein the wherein the at least one alkali soluble polymer is a polymethacrylic acid polymer having an average molecular weight in excess of 4,000.

9. A process for preparing a thermodynamically stable aqueous liquid composition containing crystalline sodium acetate trihydrate as a phase change material which is resistant to the nucleation of crystalline sodium acetate on heating and cooling, the process comprising the steps of:
   a) mixing an aqueous solution comprising sodium acetate anhydrous with the one or more alkali soluble polymers and, optionally, water to form a mixture; and
   b) heating the mixture to at or above 58° C. to provide a phase change material containing crystalline sodium acetate trihydrate, wherein the aqueous solution may optionally include an agent for modifying the melting point of sodium acetate; and
   wherein the aqueous solution comprises:
   from 40% to 60% of sodium acetate anhydrous;
   from 0.1% to 10% of at least one suitable alkali soluble polymer;
   from 0.1% to 5% of at least one suitable nucleation promoter;
   optionally, from 1% to 25% of a melting point depressing agent; and
   water to balance.

10. The process according to claim 9, wherein the mixture is heated to 60° C. to 70° C.

11. The process according to claim 9, wherein the process is carried out in a heat battery or vessel.

12. The composition according to claim 7, wherein the at least one nucleation promoter comprises disodium hydrogen phosphate dihydrate and tetrasodium pyrophosphate decahydrate present at a total combined level of from about 0.5% to about 5% by weight of the composition.

13. The composition according to claim 1, additionally comprising an agent for modifying the melting point of sodium acetate trihydrate at a level of from about 1% to about 25% by weight of the composition.

14. The composition according to claim 13, wherein the agent is lithium acetate dihydrate.

15. The composition according to claim 13, wherein the agent is lithium acetate anhydrous.

16. The composition according to claim 1, wherein the phase change material melts at about 58° C.

* * * * *